United States Patent [19]

Erhardt et al.

[11] Patent Number: 4,602,458
[45] Date of Patent: Jul. 29, 1986

[54] APPARATUS FOR THE MANUFACTURE OR WORKING OF GEARS

[75] Inventors: Manfred Erhardt, Puchheim; Herbert Loos, Dorfen-Stadt, both of Fed. Rep. of Germany

[73] Assignee: Carl Hurth Maschinen und Zahnradfabrik GmbH, Munich, Fed. Rep. of Germany

[21] Appl. No.: 684,535

[22] Filed: Dec. 21, 1984

[30] Foreign Application Priority Data

Jan. 27, 1984 [DE] Fed. Rep. of Germany ....... 3402721

[51] Int. Cl.$^4$ ............................................. B24B 19/00
[52] U.S. Cl. .............................. 51/105 GG; 51/95 GH
[58] Field of Search ........ 51/105 GG, 52 HB, 95 GA

[56] References Cited

U.S. PATENT DOCUMENTS

| | | | |
|---|---|---|---|
| 3,147,535 | 9/1964 | Wildhaber | 51/105 GG |
| 3,443,341 | 5/1969 | Honula | 51/105 GG |
| 3,971,293 | 7/1976 | Hunkeler | 51/105 HB |

FOREIGN PATENT DOCUMENTS 210855  6/1984  German Democratic Rep. ... 51/105 GG

Primary Examiner—Harold D. Whitehead
Attorney, Agent, or Firm—Flynn, Thiel, Boutell & Tanis

[57] ABSTRACT

Apparatus for the manufacture or working of straight or helically toothed, externally or internally toothed gears comprising a hyperboloidally or globoidally or similarly formed toothed tool, which has an abrasive or similar surface and which grips the workpiece over the entire width of the tooth. The axes of the workpiece and the tool are vertically spaced and crossed and the workpiece and the tool are each connected to a guide gear, which guide gears are coupled to one another. A control gearing is provided in the connection between the workpiece-tool pairing and the guide gear pairing.

3 Claims, 4 Drawing Figures

APPARATUS FOR THE MANUFACTURE OR WORKING OF GEARS

FIELD OF THE INVENTION

The invention relates to an apparatus for the working of the tooth system of straight or helical toothed gears and, more particularly, to a device for controlling the operative flank of a tool tooth on a tooth of a workpiece.

BACKGROUND OF THE INVENTION

Under the term "abrasive surface" in the sense of the invention is meant a chip-removing surface of the tool, which does not have uniformly directed cutting edges or the like. This includes all tools with a granular working surface, for example grinding tools, however, also tools for electrolytic or electro-erosive or electrochemical material removal. (This does not include for example shaving gears.)

A known apparatus works in such a manner that only one side of the tool teeth engages the counterflank of the workpiece teeth. A backlash exists on the other tooth side. During a working operation, it is possible to change the effective tooth side. The guide gears can run without clearance. It can be preferable—in particular if the tool is moved toward the workpiece by a change in the center-distance—if the guide gears also engage one another on one tooth side, namely, referred to the tool-workpiece pairing with the other tooth side. Then both the workpiece-tool pairing and also the guide gear pairing run with backlash, however, the entire gearing runs without clearance (i.e. no play). The known apparatus works practically without longitudinal feed (German Pat. No. 33 04 980.7).

In the known apparatus of this type, the tooth flanks were pressed onto one another with the help of a braking mechanism and/or with the help of flywheel masses. The working flanks were changed either through a change in the direction of rotation of the drive motor and/or by means of clutches.

The basic purpose of the invention is to simplify and also possibly accelerate the exchange of the working flanks, and to more simply regulate the pressure of the tooth flanks which act on one another.

The basic purpose of the invention is attained by providing an apparatus of the above-described type, and which a control gear for causing an existing rotation to undergo an additional amount of rotation. Such a control gear can for example be a so-called total gearing (planetary gearing) with two center gears and a planetary web. (Such gears are known). Two of the mentioned members then facilitate the normal drive or output and the third member facilitates the additional amount of rotation.

If the additional rotation is only limited, then a simplification is possible by the use of helically toothed gears, of which one is longitudinally movable and drivable therefor. The longitudinal movement causes then the additional rotation at the output of the control gear.

Further advantages and characteristics of the invention result from the following description.

BRIEF DESCRIPTION OF THE DRAWINGS

The invention will be discussed with reference to the exemplary embodiments of FIGS. 1 to 4, in which.

DETAILED DESCRIPTION

Figure 1:
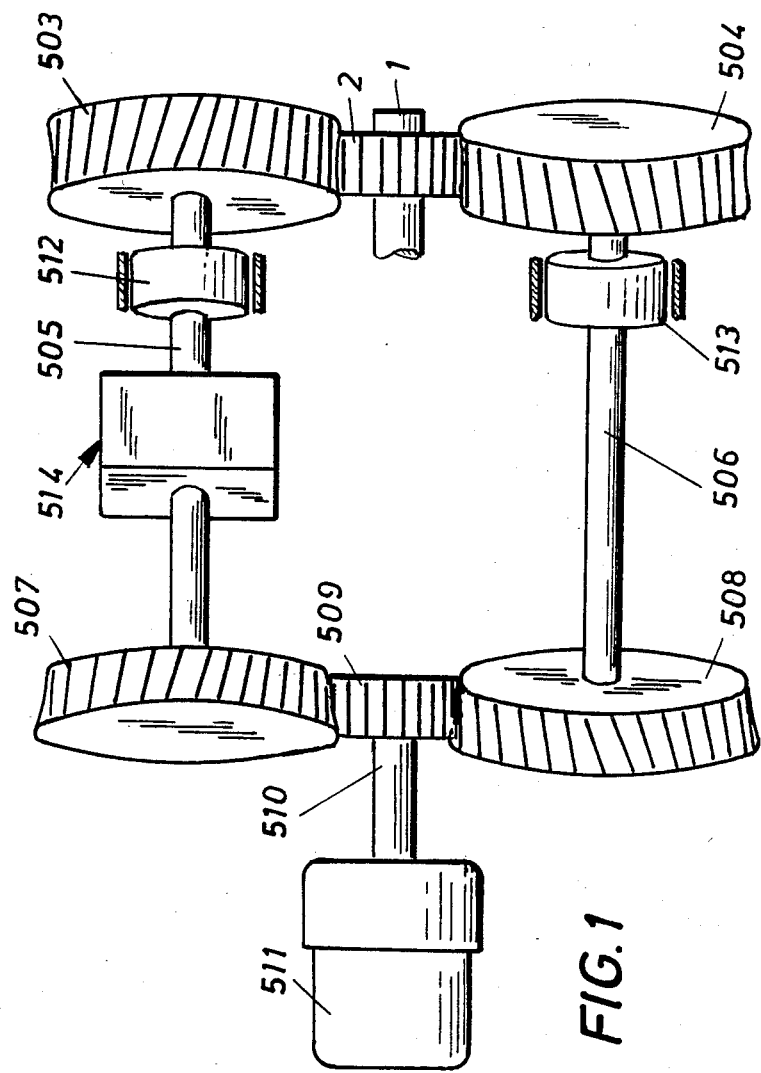
FIG. 1 schematically illustrates an apparatus according to the invention.

A gear which is to be machined, namely, a workpiece 2, is exchangeably clamped or chucked on a workpiece spindle 1 (FIG. 1). The clamping device or chucking device is not shown since it is known. The workpiece 2 is worked or machined by two toothed tools 503 and 504. The tools are exchangeably clamped on a first and a second tool spindle 505 or 506, respectively. The axes of the workpiece spindle 1 on the one hand and of the tool spindles 505 and 506 on the other hand are vertically spaced from each other and are skewed or crossed so that the two tool spindles form a crossed-axes angle to one another. Thus in FIG. 1, the two tool spindles do not lie in the plane of the drawing. Consequently, the workpiece-tool pairing 2, 503 and 504 and the later mentioned guide gear pairing also do not lie in the plane of the drawing. The tools 503 and 504 grip around the workpiece 1 hyperboloidally or globoidally or in a similar manner. The teeth of the tools contact the teeth of the workpiece only with one tooth flank in each case, and backlash exists on the back flank. Since the apparatus works in the plunge method, the tool teeth are at least as wide as the workpiece teeth. The teeth of the tools have, at least on the working flanks, an abrasive material.

The guide gear pairing 507 and 508 is exchangeably clamped to the other end of the tool spindles 505 and 506. The pair of gears 507 and 508 each mate together with a drive pinion 509. The gears 507, 508 and 509 are oriented like the gears 1, 503 and 504, namely, they have a crossed axes relation. Both gears 507, 508 and 509 and 1, 503 and 504 have the same gear transmission ratio. They all can have a common crossed-axes point (common normal) which, for example, extends between the two gears. In this instance, the workpiece 1 and the drive pinion 509 are arranged coaxially. On the other hand, every gear can have its own (separate) crossed-axes point. In this instance, the elements 1 and 509 do not need to be coaxially related.

A drive pinion 509 can be driven through a drive shaft 510 by a motor 511. The motor can be reversed. A brake 512 and 513 is arranged on each of the tool spindles 505 and 506 in order to be able to stop the spindles as desired and corresponding with the chosen working or machining method.

Figure 2:
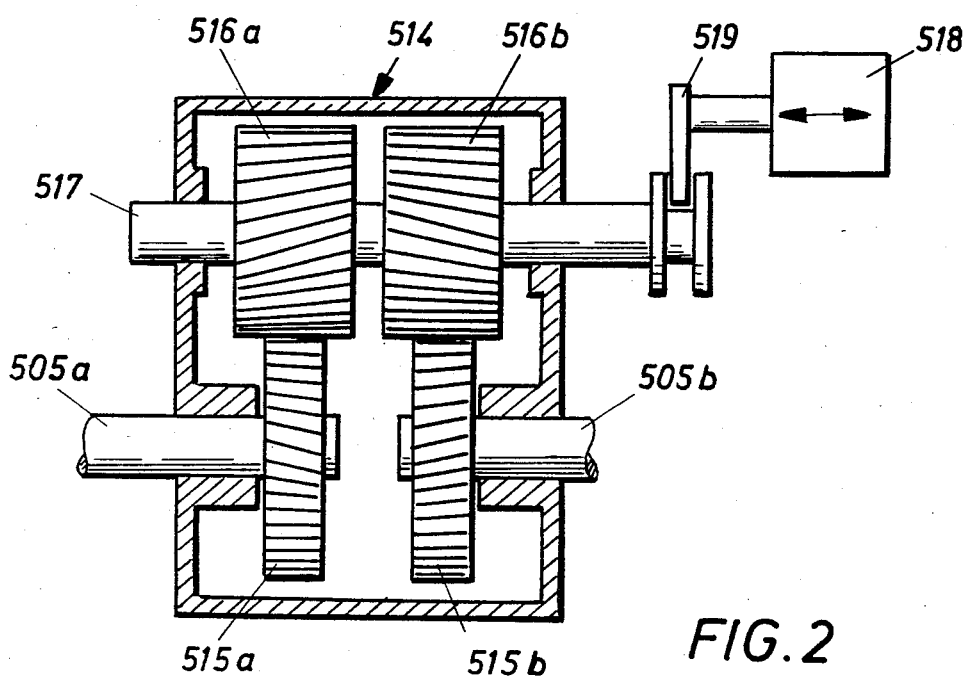
FIG. 2 schematically illustrates in cross section an example for a control gear of the apparatus according to FIG. 1.

One of the tool spindles, for example the spindle 505, is provided with a control gear 514 which is schematically illustrated in FIG. 2. The first tool spindle 505 is for this purpose divided into two shafts 505a and 505b each of which is coupled with the corresponding gear 507 or toothed tool 503. A helically toothed pinion 515a and 515b is arranged on the end of each of the shafts 505a and 505b, which ends are mutually adjacent one another. Their tooth angles are opposite as this is schematically indicated in FIG. 2. They have the same number of teeth. The two pinions 515a and 515b each mate with a gear 516a and 516b, which are both, corresponding with the pinions, helically toothed and are sufficiently wide that they can be moved axially without becoming disengaged. The two control gears 516a and 516b are fixed to a longitudinally or axially movable shaft 517. A shift motor 518 is provided for moving the shaft 517 axially. The motor engages the shaft 517 by means of a shift fork 519. If the motor 518 is turned on, then the helically toothed gears 516a and 516b are shifted axially. Since the tooth angles of the control gear pair 516a and 516b are opposite, the two pinions 515a and 515b are thereby rotated in opposite directions when the shaft 517 is shifted axially. Depending on this additional movement, one or the other tooth flank on a tooth will selectively rest on the tool-workpiece pairing 503, 2 or on the guide gear pairing 507, 509. The operative tooth flanks can also be changed by selectively operating the brakes 512 and 513.

Thus it is possible in the apparatus according to FIG. 1 to change the working tooth flank either with the control gear or with the brakes or with a combination of both.

Bearings, feed means and other elements which are common in the machine tools are not illustrated since they are known.

Figure 3:
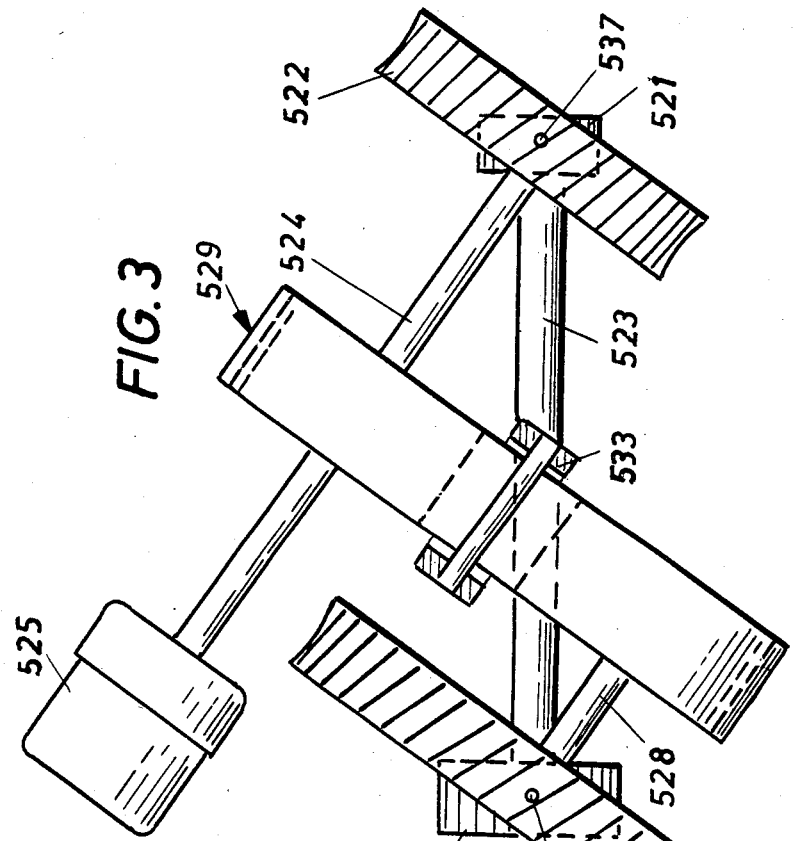
FIG. 3 schematically illustrates a different exemplary embodiment for the invention having a toothed belt or chain drive.
Figure 4:
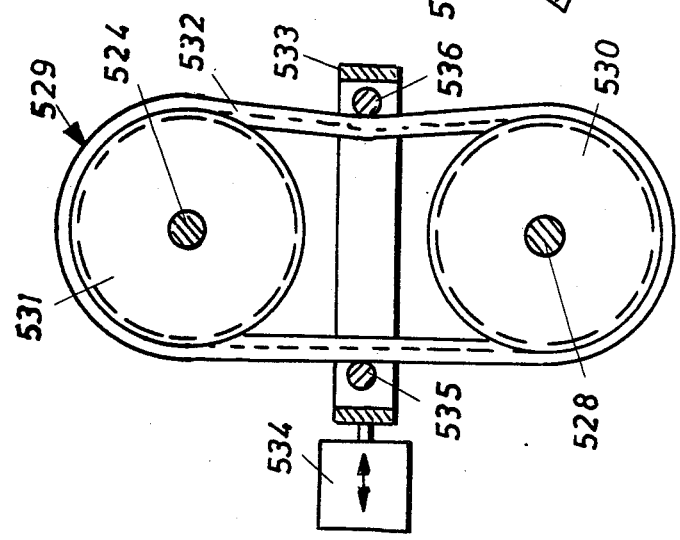
FIG. 4 schematically illustrates the toothed belt or chain drive of FIG. 3 in cross section.

In the exemplary embodiment according to FIGS. 3 and 4, the workpiece 521 is worked by only one tool 522. The tool is designed in a manner as it was described in connection with FIG. 1. The workpiece 521 is exchangeably mounted on a workpiece spindle 523. The tool 522 is exchangeably mounted on a tool spindle 524. A motor 525 is provided at one end of the tool spindle 524. A guide gear 526 is exchangeably mounted on the free end of the workpiece spindle 523, which guide gear mates with a second guide gear 527. The axes of the workpiece and tool, on the one hand, and the guide gears, on the other hand, are spaced vertically and crossed. Each of the mentioned gears has a separate crossed-axes point (common normal) 537 and 538. The second guide gear 527 is exchangeably mounted on a shaft 528. The two gear pairs 521 and 522 and 526 and 527 have the same gear transmission ratio.

The tool spindle 524 and the shaft 528 are connected by means of a toothed belt or chain drive mechanism 529, which acts as a control gear. The toothed belt or chain drive consists substantially of a toothed disk 530, which is mounted on a shaft 528, a second toothed disk 531 is mounted on the tool spindle 524, and a toothed belt or chain 532 which is guided around both disks. A clamping bar 533 is arranged between the toothed disks and grips the periphal surface of the toothed belt or chain. The clamping bar is movably supported perpendicularly with respect to a plane containing the axes of rotation for the toothed disks 530 and 531 and can be driven by a motor 534 for this purpose. Two rollers 535 and 536 are supported in the clamping bar, of which rollers one engages, depending on the position of the clamping bar, the outside on the toothed belt or chain and deflects or tensions same. By exchanging the effective belt tensioning roller, namely, by exchanging the deflected reach of the toothed belt, the shafts 524 and 528 undergo an additional rotation to selectively cause one or the other flank of the tool teeth to be moved to engage the workpiece teeth.

A suitable design of the invention can also be used for the manufacture of internally toothed workpieces or with internally toothed tools. Moreover, the invention is not to be limited to the described and illustrated arrangement of the control gear and of the brakes. These devices can be arranged, for example, laterally of the tool and the guide wheel instead of therebetween.

The embodiments of the invention in which an exclusive property or privilege is claimed are defined as follows:

1. In an apparatus for the working of a tooth system of straight or helically toothed workpiece gears comprising a hyperboloidally or globoidally formed toothed tool having an abrasive, chip-removing surface and which has a sufficient axial dimension such that it is in engagement with said workpiece from one axial face of said tooth system of said workpiece to the other axial face thereof, wherein a crossed-axes angle is provided between said workpiece and said tool which defines a workpiece-tool pairing, and wherein said tool and said workpiece are each connected to a guide gear, said guide gears being coupled to one another to define a guide gear pairing, said guide gear pairing having a gear transmission ratio which is the same as a gear transmission ratio of said workpiece-tool pairing and having opposing tooth flanks engaging another with backlash and wherein said workpiece and said tool roll along on another such that during a working operation only a right or a left flank of each tool tooth engages with backlash an opposing tooth flank of said tooth system on said workpiece, the improvement comprising wherein connecting means are provided between said workpiece-tool pairing and said guide gear pairing, said connecting means including a control gear means for adjusting a reciprocal angular position of one of said guide gears and a tool connected thereto for the purpose of changing a flank abutment in said workpiece-tool pairing and in said guide gear pairing and causing said guide gear pairing and said workpiece-tool pairing to operate as a unit and without backlash.

2. The apparatus according to claim 1, wherein said control gear means includes a gear drive mechanism having two equally large, oppositely helically toothed pinions, wherein one toothed pinion is fixedly connected to one guide gear which engages without clearance the other of said guide gears, and wherein the other of said toothed pinions is fixedly connected to said tool, and wherein said control gear means further includes a pair of control gears each engaging a respective toothed pinion, said control gears being of equal size and oppositely helically toothed and are fixedly connected to one another and are together axially movable for facilitating the selective rotation of said toothed pinions in opposite directions with respect to one another.

3. The apparatus according to claim 1, wherein said control gear means includes a toothed belt or chain drive mechanism having a first gear which is fixedly coupled to said tool and a second gear which is fixedly coupled to one of said guide gears, said first and second gears being equally large and having parallel axes and a toothed belt or chain guided therearound, and wherein, straddling the outside sides of said toothed belt or chain drive, there is provided a pair of tensioning rollers, arranged on a common clamping bar that is longitudinally movable perpendicularly to a plane defined by said parallel axes for facilitating a selective tensioning of one or the other of said outside sides of said toothed belt or chain.

* * * * *